Sept. 4, 1934.   J. McK. COYNER   1,972,375
CALF FEEDING PAIL
Filed Feb. 13, 1933
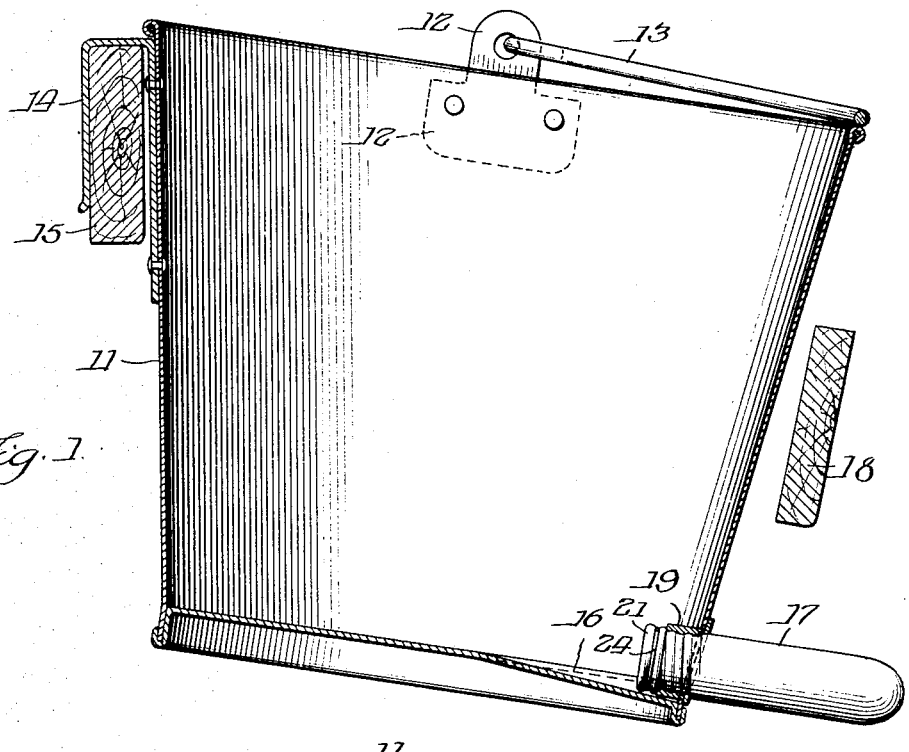
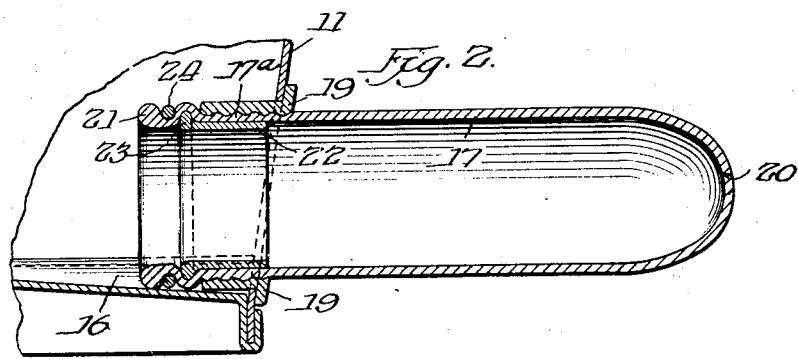
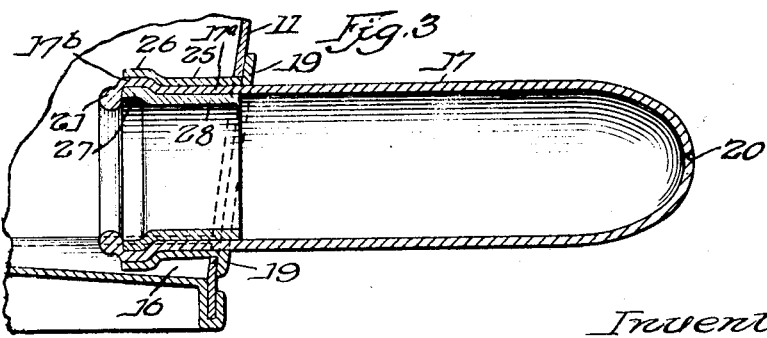
Inventor:
James M. Coyner Patented Sept. 4, 1934

1,972,375

UNITED STATES PATENT OFFICE 1,972,375

CALF FEEDING PAIL

James McKee Coyner, Madison, Wis.

Application February 13, 1933, Serial No. 656,547

7 Claims. (Cl. 119—71)

My invention has for its primary object the provision of means to facilitate the feeding of suckling calves on the farm by simulating as closely as practicable the conditions under which nature prompts the young to feed by nursing the mother.

Dairymen find it desirable to take the calf from the cow when quite young in order to avoid injury to the cow's udder and to avail of the cow's milk supply for the marketing of milk or cream, or to feed to the calf skimmed milk or other liquid supplemented or enriched by such added fats as may be found suitable to be combined with the milk for proper nourishment.

Calves may be weaned and taught to drink at a tender age, but aside from the trouble involved the feeding of young calves by drinking is not conducive to the production of first quality veal but tends to a "pot-belly" condition and lack of firmness and fatness of flesh and desirable color.

The first and second compartments of the quadripartite bovine stomach, under natural conditions, do not come into use during the early months of the nursing calf. The milk by-passes the rumen or first stomach, and the reticulum or second stomach, of the suckling calf and enters directly into the omasum or third stomach, and thence to the abomasum or fourth stomach, where it is subjected to the action of the rennin before entering the duodenum of the digestive tract.

On the other hand, the milk fed to the drinking calf passes into the first and second stomach compartments as do the food and drink of the mature animal, and these stomach compartments are brought into use at an earlier age than intended by nature, and their periodical distention results in a souring or fermentation of the milk and a persistent distortion or "pot-bellied" condition.

Suckled calves command a better market as veal than drinking calves and the dairyman profits by so feeding his calves up to the time of marketing. My invention enables him to utilize his surplus skim milk by providing a convenient feeding pail from which the calf may suck its food supply, such pail being equipped with a teat which may be seized by the calf and suction applied in the natural manner.

Such feeding pails are not broadly new but heretofore they have been associated with attendant disadvantages such as abnormal relation to the calf's mouth, extraneous solid portions which may enter between the lips and break the suction, loosening of the teat due to the pushing and pulling natural to the suckling calf and periodical lunging as the calf becomes impatient at a flow inadequate quickly to satisfy its hunger.

My invention is designed to meet and avoid these disadvantages by the provision of certain features of construction, the nature and importance of which will be apparent from the following disclosure predicated upon the accompanying drawing wherein are set forth preferred and modified embodiments of the same by way of illustration.

In the drawing

Fig. 1 represents in vertical section a pail embodying my invention;

Fig. 2 is a detail section showing the mounting of the teat in the pail upon a larger scale; and Fig. 3 is a similar section illustrating a slightly different form of mounting.

Having particular reference to the drawing, the pail 11 is shown as provided with the usual ears 12 and bail 13 and also at the rear side with a hook 14 of strap metal arranged to take over the supporting rail 15 of substantial size such as a 2" x 4" whereby to suspend the pail in a substantially rigid position. The bottom of the pail is preferably provided with a depression or tapering groove 16 by which the last of the contents will be directed to the lowermost point of the pail at substantially the level of the entrance to the teat 17. In advance of the pail is indicated a plank 18 above the teat 17 which serves as a bumper to protect the pail from any lunging by the calf during feeding, being so spaced from the teat as not to impede access thereto and near enough to protect the pail from being struck by the animal's head. It will be understood that the rail 15 and the plank 18 extend between posts or other suitable means for positioning and supporting the same.

The pail at the side opposite the suspending hook 14 and adjacent the lower edge in line with the groove 16 is apertured and provided with a bushing 19 which is preferably corrugated on its inner face, which corrugations may be spiral simulating a coarse thread.

The teat 17 is of flexible, stretchable rubber simulating in size and shape a cow's teat and is provided at its forward end with a small milk discharge aperture 20, while the rear end is open and is provided preferably with a marginal rib or bead 21. A distending shell 22 generally cylindrical but marginally flanged at 23 is inserted for some distance within the open rear end of the teat and serves to confine a portion 17a between the bushing 19 and said shell. The walls of the distending shell are sufficiently thin that it has an interior diameter substantially the same as that of the teat at the rear open end whereby to maintain practically unimpaired the flow capacity of the teat. That portion of the teat extending into the pail beyond the bushing 19 is then encircled by a ring 24 and which constricts the rubber and causes said ring to seat between the shell flange 23 and the teat rib 21.

The operation of assembly is advantageously accomplished by first inserting the shell 22 within the teat adjacent its open end, then collapsing the forward portion of the teat and passing it through the bushing 19 from within the pail outward. Tension then applied to the outer end of the teat will cause the rubber at 17a to stretch and reduce in thickness, thus enabling the shell to be drawn into position and clamp the rubber at 17a firmly within the corrugations of the bushing 19a. Thereupon the ring 24 is placed about the open inner end of the teat and the assembly is complete as indicated.

A suckling cafe, becoming impatient, is prone to hunch against the udder of the cow and to endeavor constantly to obtain a better grip upon the teat. Provision is here made for such natural tendency by providing the bumper plank 18 in front of the calf's head to protect the pail and, as will be observed, there are no solid projections from the pail within or without the teat so that as the calf endeavors to draw the teat into its mouth and to advance upon the same to get a better grip in its impatience there is nothing upon which the lower teeth or upper gum of the calf can impinge which would break the suction.

Moreover, the lunging of the calf and the massaging of the teat by the action of its jaws result in a tendency of the nipple to work inwardly of the pail and to become partially disassembled therefrom so that the milk will leak about the exterior of the heat. There would also be a tendency of the inner end of the teat to collapse under suction if dependence were had solely upon the resilience of the rubber to hold it expanded within the bushing.

To meet these conditions, a rugose surface is provided on the interior of the bushing and the rubber at 17a is clamped against such roughened surface by the cylindrical portion of the distending shell 22 which effectually precludes collapsing or leakage. The constrictive effect of the ring 24 about the open end of the rubber between the bead 21 and the shell flange 23 precludes the shell working rearwardly out of such diametric relation to the bushing 19 as would permit of collapse and leakage.

In Fig. 3 a modified form of mounting is illustrated wherein the ring 24 previously described is omitted and the bushing is modified as illustrated at 25 to provide the same with an enlarged portion 26 within which the rubber at 17b is expanded by the marginal enlargement 27 of the shell 28. In this form of construction the marginal bead or ring 21 of the teat is by its own elasticity constricted to its normal size after insertion of the shell portion 27 so that it occupies a position in line with and prevents the disassociation of the shell rearwardly of the teat, thus functioning as an equivalent of the separate ring 24.

It will be appreciated that by my invention provision is made for a calf feeding pail from which the young calf may nurse, which pail is readily suspended in a substantially fixed position and protected by a bumper; that there are no solid projections exterior to the pail either within or without the soft rubber teat by which the mouth of the calf may be injured or the feeding interfered with by breaking of the suction; that the assembly of the teat with the pail is simple and yet proof against disassembly or maladjustment due to vigorous manipulation of the teat by the calf. The pail embodying my invention is inexpensive to manufacture and may be readily set up for use in a barnyard without complicated or expensive provision of supporting devices. It will also be appreciated that by the provision of such an efficient means for feeding suckling calves, the dairyman is able to utilize his cows to the best advantage in the sale of cream and other dairy products without the necessity of pail feeding young calves and thus impairing their health and their ultimate value as veal.

I claim:

1. A feeding pail with means to rigidly suspend the same at the upper rear and provided with an orifice at the lower front and with a groove in the pail bottom leading to the orifice, in combination with a suckling device assembled with the pail and comprising a bushing with a roughened inner wall seated within the orifice and extending rearwardly into the pail, a rubber teat seated in the bushing with its open end marginally beaded and extending into the pail with its closed end projecting from the pail, a distending shell having a cylindrical portion seated within the teat and bushing and exteriorly flanged rearwardly of the bushing and forwardly of the bead, and a constricting ring about the open end of the teat between the bead and flange and inwardly of the pail, the bushing and shell being disposed substantially wholly within the pail.

2. A feeding pail with means to rigidly support the same and provided with an orifice at the lower front, in combination with a suckling device assembled with the pail and comprising an annular bushing seated in the orifice, a rubber teat having a beaded open end seated in the bushing with its open end extending into and its closed end outside the pail, and an annular distending shell within the teat, said shell having an inner diameter substantially the same as that of the teat at the rear open end, whereby to maintain practically unimpaired the flow capacity of the teat, the bushing and shell being substantially within the outer confines of the pail and the rear end of the shell being in advance of the bead.

3. A feeding pail with means to rigidly support the same and provided with an orifice at the lower front, in combination with a suckling device assembled with the pail and comprising an annular bushing seated in the orifice, a rubber teat seated in the bushing with its open end extending into and its closed end outside the pail, an annular distending shell within the teat and opposed to the bushing, said shell having an inner diameter substantially the same as that of the teat at the rear open end, whereby to maintain practically unimpaired the flow capacity of the teat, the shell and bushing being substantially within the outer confines of the pail, and a constricting ring carried by the open end of the teat rearwardly of the shell.

4. A feeding pail provided with suspending means for the same at the upper rear and provided with an orifice at the lower front, in combination with a suckling device assembled with the pail and comprising a rubber teat having a beaded open end and seated in the orifice with its open end extending into and its closed end outside the pail, an annular thin-walled distending shell within and clamping the teat within the walls of the orifice, the rear end of the shell being in advance of the bead, and said shell having an inner diameter approximating that of the teat at the open rear end, whereby to maintain substantially unimpaired the flow capacity of the teat, the shell being substantially within the outer confines of the pail whereby to present no solid extraneous parts for grasping by the animal.

5. A feeding pail provided with suspending means for the same at the upper rear in a tilted position and provided with an orifice at the lower front, in combination with a suckling device assembled with the pail and comprising an annular bushing with a roughened inner wall seated withing the orifice and extending rearwardly into the pail, a rubber teat seated in the bushing with its rear open end marginally beaded and extending into the pail with its closed forward end projecting from the pail, a thin-walled distending shell having a cylindrical portion seated within the teat and bushing and exteriorly flanged rearwardly of the bushing and forwardly of the bead, a constricting ring about the open end of the teat between the bead and flange and inwardly of the pail, a support for the suspending means at the rear of the pail, and a separate bumper in front of the pail above the projecting teat, said shell having an inner diameter substantially the same as that of the teat at the rear open end, whereby to maintain practically unimpaired the flow capacity of the teat, the bushing and shell being substantially within the outer confines of the pail whereby to present no solid extraneous parts for grasping by the animal.

6. A feeding pail with means to rigidly suspend the same at the upper rear in a tilted position and provided with an orifice at the lower front, in combination with a suckling device assembled with the pail and comprising an annular bushing fitted within the aperture and having a roughened inner wall, said bushing extending inwardly into the pail, a rubber teat seated within the bushing with its rear open mouth projecting into the pail and having a marginal elastic bead, a generally cylindrical thin metal shell fitted closely within the teat in diametric opposed relation to the bushing and terminating rearwardly short of the elastic bead, the bushing and shell being substantially within the outer confines of the pail whereby to present no solid extraneous parts for grasping by the animal.

7. A feeding pail with means to rigidly suspend the same at the upper rear in a tilted position and provided with an orifice at the lower front, in combination with a suckling device assembled with the pail and comprising a bushing fitted within the aperture and having a roughened inner wall, said bushing extending inwardly into the pail, a rubber teat seated within the bushing with its rear open mouth projecting into the pail and having a marginal elastic bead, a generally cylindrical rigid thin-walled shell fitted closely within the teat in diametric relation to the bushing and having a radial flange at its rear end within the teat forwardly of the bead, and a constricting ring encircling the open end of the teat between the bead and the flange of the inserted shell, the bushing and shell being substantially within the outer confines of the pail whereby to present no solid extraneous parts for grasping by the animal.

JAMES McKEE COYNER.